(12) United States Patent
Emerson

(10) Patent No.: US 12,062,504 B2
(45) Date of Patent: Aug. 13, 2024

(54) LOW PROFILE SWITCH PANEL ASSEMBLY

(71) Applicant: IDD AEROSPACE CORPORATION, Redmond, WA (US)

(72) Inventor: Alan L. Emerson, Redmond, WA (US)

(73) Assignee: IDD AEROSPACE CORPORATION, Redmond, WA (US)

( * ) Notice: Subject to any disclaimer, the term of this patent is extended or adjusted under 35 U.S.C. 154(b) by 256 days.

(21) Appl. No.: 17/621,179

(22) PCT Filed: Aug. 24, 2020

(86) PCT No.: PCT/US2020/047661
§ 371 (c)(1),
(2) Date: Dec. 20, 2021

(87) PCT Pub. No.: WO2021/041328
PCT Pub. Date: Mar. 4, 2021

(65) Prior Publication Data
US 2022/0359132 A1    Nov. 10, 2022

Related U.S. Application Data

(60) Provisional application No. 62/892,739, filed on Aug. 28, 2019.

(51) Int. Cl.
*H01H 13/02*    (2006.01)
*H01H 13/14*    (2006.01)
*B64D 47/00*    (2006.01)

(52) U.S. Cl.
CPC .......... *H01H 13/14* (2013.01); *H01H 13/023* (2013.01); *B64D 47/00* (2013.01)

(58) Field of Classification Search
CPC .............................. H01H 13/023; B64D 47/00
(Continued)

(56) References Cited

U.S. PATENT DOCUMENTS 3,500,282 A * 3/1970 Slagg ..................... H01C 10/32
                                                338/184
3,560,672 A * 2/1971 Ludlum ................ H01H 19/11
                                                200/11 D
(Continued)

FOREIGN PATENT DOCUMENTS

EP        0685860        12/1995

OTHER PUBLICATIONS

International Application No. PCT/US2020/047661, International Search Report and Written Opinion mailed on Nov. 19, 2020, 14 pages.

(Continued)

*Primary Examiner* — Anatoly Vortman
(74) *Attorney, Agent, or Firm* — Kilpatrick Townsend & Stockton LLP

(57) ABSTRACT

A switch panel for an aircraft includes a cover and a back plate. A distance from the cover to the back plate is a thickness of the switch panel. In some cases, the thickness is less than about 9.525 mm. A button assembly for a switch panel for an aircraft includes a button base, a button retainer, and a lens. The button base includes a bottom end, a base side, and a transition portion between the bottom end and the base side. In certain cases, the transition portion of the button base is beveled or radiused with a sloped or concave shape.

16 Claims, 9 Drawing Sheets

(58) Field of Classification Search
USPC .......................................................... 337/79
See application file for complete search history.

(56) References Cited

U.S. PATENT DOCUMENTS

| | | | | |
|---|---|---|---|---|
| 4,045,637 | A * | 8/1977 | Mongeau | H01H 21/04 |
| | | | | 200/11 R |
| 4,078,405 | A * | 3/1978 | Steinbach | E05B 45/10 |
| | | | | 70/DIG. 49 |
| 4,419,546 | A * | 12/1983 | Arthur | H01H 19/11 |
| | | | | 200/11 G |
| 4,440,368 | A * | 4/1984 | Kitchen | G12B 9/00 |
| | | | | 248/27.1 |
| 4,499,352 | A * | 2/1985 | Fujita | H02B 1/044 |
| | | | | 200/296 |
| 4,673,780 | A * | 6/1987 | Kenway | H01H 13/063 |
| | | | | 200/302.2 |
| 4,742,187 | A * | 5/1988 | Sorenson | H01H 1/16 |
| | | | | 200/11 K |
| 5,373,132 | A * | 12/1994 | Achermann | H01H 13/023 |
| | | | | 200/313 |
| 6,158,867 | A | 12/2000 | Parker et al. | |
| 6,255,612 | B1 * | 7/2001 | Campana | H02B 1/048 |
| | | | | 200/520 |
| 6,509,823 | B2 * | 1/2003 | Meckler | H02B 1/044 |
| | | | | 337/380 |
| 7,034,234 | B1 * | 4/2006 | Brillhart | H01H 19/06 |
| | | | | 200/336 |
| 11,165,229 | B2 * | 11/2021 | Wu | H01H 13/04 |
| 2014/0168937 | A1 | 6/2014 | Kato et al. | |

OTHER PUBLICATIONS

International Application No. PCT/US2020/047661, International Preliminary Report on Patentability mailed on Mar. 10, 2022, 9 pages.

European Application No. 20767677.6, Intention to Grant mailed on Apr. 24, 2024, 8 pages.

* cited by examiner

LOW PROFILE SWITCH PANEL ASSEMBLY

CROSS REFERENCE TO RELATED APPLICATION

This application is related to and claims priority benefits from U.S. Provisional Application Ser. No. 62/892,739, filed on Aug. 28, 2019, and entitled LOW PROFILE SWITCH PANEL, the content of which is hereby incorporated in its entirety by this reference.

FIELD OF THE INVENTION

This application relates to switch panels for vehicles, in particular in the aviation or automotive industries, and more particularly to switch panels with light-emitting buttons.

BACKGROUND

Switch panels for vehicles, particularly in the aviation industry, include push buttons, knobs, switches, etc. that must provide several functions in a limited amount of space. In particular, the buttons must provide an electrical contact with a corresponding contact on the panel when pressed, and the buttons must also convey information to the user via tactile feedback and/or backlit illumination of the buttons via incandescent lamps. Typically, light from the incandescent lamps is distributed to the buttons via a light-pipe. To accommodate the light sources, light-pipe, and other components needed for the switch panel, traditional switch panels are generally thick and have a high profile. As used herein, a "high profile" switch panel has a thicknesses of 9.525 mm or greater. Such switch panels are bulky for areas of limited space (such as aircraft cockpits) and have increased weights that may be limiting to weight-sensitive vehicles such as aircraft.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present invention, an aircraft switch panel assembly includes a cover, a button stop, a switch, at least one light source, and a button assembly. The cover includes a cover receiving area and a cover opening providing access to the cover receiving area. The button stop may be within the cover receiving area, and the button stop defines a button stop receiving area that is aligned with the cover opening. The switch may be within the button stop receiving area, and the at least one light source may be within the button stop receiving area. The button assembly may be positioned at least partially in the cover opening and the cover receiving area. The button assembly is movable between an engaged position and a disengaged position relative to the switch, and, in the engaged position, the button assembly contacts the button stop and the switch.

In some embodiments, in the disengaged position, a ledge of the button assembly contacts the cover and the button assembly is spaced apart from the button stop and the switch. In certain embodiments, the aircraft switch panel assembly also includes a back plate, and the cover receiving area is defined between the cover and the back plate. The cover includes a cover outer surface and the back plate includes a back plate outer surface, and a distance from the cover outer surface to the back plate outer surface is a thickness of the aircraft switch panel assembly. In some embodiments, the thickness is less than 9.525 mm.

In various embodiments, the button assembly includes a button base, a button retainer, and a lens. The button base includes a bottom end, a base side, and a transition portion between the bottom end and the base side, and the transition portion of the button base may be beveled or radiused with a concave or sloped shape. The button retainer may be supported on the button base, and the button assembly may be configured to direct light from below the button base from the at least one light source, through the transition portion, through the button retainer, and through the lens. In certain examples, the bottom end of the button base defines a plunger cavity recessed in the bottom end, and the button retainer includes a ledge within the cover receiving area. The button assembly may also include a plunger at least partially within the plunger cavity and that contacts the switch in the engaged position. In certain cases, the ledge of the button retainer contacts the button stop in the engaged position. In some embodiments, a cavity wall of the plunger cavity extends at an oblique angle relative to the bottom end.

In certain embodiments, the button stop defines a closed perimeter, and the button stop receiving area is within the closed perimeter. In various examples, the button stop is opaque.

According to certain embodiments of the present invention, a switch panel assembly for an aircraft includes a cover, a back plate, a switch, and a button assembly. The cover may define a cover receiving area and a cover opening providing access to the cover receiving area, and the cover includes a cover outer surface. The back plate may define a mounting surface of the switch panel assembly facing a direction opposite of the cover outer surface. The switch may be within the cover receiving area and aligned with the cover opening. The button assembly may be positioned at least partially in the cover opening and the cover receiving area, and the button assembly is movable between an engaged position and a disengaged position relative to the switch. A distance from the cover outer surface to the mounting surface of the back plate is a thickness of the switch panel assembly, and in certain embodiments, the thickness is less than 9.525 mm.

In some embodiments, the switch panel assembly also includes a button stop within the cover receiving area and that defines a button stop receiving area aligned with the cover opening. The switch panel assembly may also include at least one light source within the button stop receiving area. In various cases, the switch is within the button stop receiving area. In various embodiments, the button stop defines a closed perimeter, and the button stop receiving area is within the closed perimeter.

In various embodiments, the thickness of the switch panel assembly is 6.35 mm. In some examples, in the disengaged position, the button assembly contacts the cover within the cover receiving area and the button assembly is spaced apart from the switch, and, in the engaged position, the button assembly contacts the switch and a ledge of the button assembly is spaced apart from the cover within the cover receiving area. In certain embodiments, the button assembly also includes a button base having a bottom end, a base side, and a transition portion between the bottom end and the base side, and the transition portion of the button base is beveled or radiused with a concave or sloped shape. The button assembly may also include a button retainer supported on the button base and a lens. In various embodiments, the button assembly is configured to direct light from below the button base, through the transition portion, through the button retainer, and through the lens. In some cases, the bottom end of the button base defines a plunger cavity recessed in the bottom end and the button retainer includes a ledge within the cover receiving area. The button assembly may also include a plunger at least partially within the plunger cavity that contacts the switch in the engaged position.

According to certain embodiments of the present invention, a button assembly for a switch panel for an aircraft includes a button base, a button retainer, and a lens. The button base includes a bottom end, a base side, and a transition portion between the bottom end and the base side. In some cases, the transition portion of the button base is beveled or radiused with a concave or sloped shape, and the transition portion may be transparent such that light may pass through the transition portion. The button retainer may be supported on the button base. In various cases, the button assembly is configured to direct light from below the button base, through the transition portion, through the button retainer, and through the lens.

In some embodiments, the bottom end of the button base defines a plunger cavity recessed in the bottom end and the button retainer comprises a ledge. In various cases, the button assembly also includes a plunger cavity recessed in the bottom end. A plunger stem may be within the plunger cavity, and a plunger may be supported on the plunger stem at least partially within the plunger cavity. In various embodiments, a cavity wall of the plunger cavity extends at an oblique angle relative to the bottom end and the cavity wall is opaque. In some examples, the cavity wall is reflective, and the oblique angle is 45°. In certain embodiments, the button assembly also includes at least one intermediate layer between the button base and the lens, and the at least one intermediate layer includes at least one of a diffuser or a filter.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, a switch panel assembly has a switch panel and at least one button assembly. While the switch panel assembly is discussed for use with aircraft, it is by no means so limited. Rather, embodiments of the switch panel assembly may be used in other types of vehicles or applications as desired.

Figure 6:
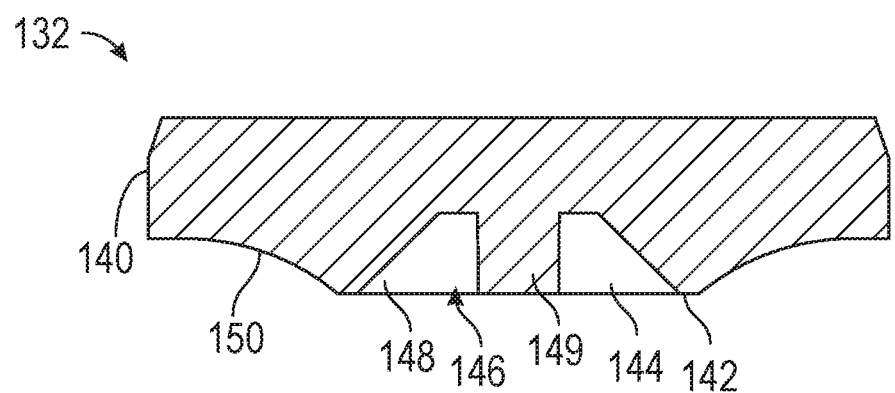
FIG. 6 is a sectional view of the button base of FIG. 4 taken along line 6-6 in FIG. 5.
Figure 7:
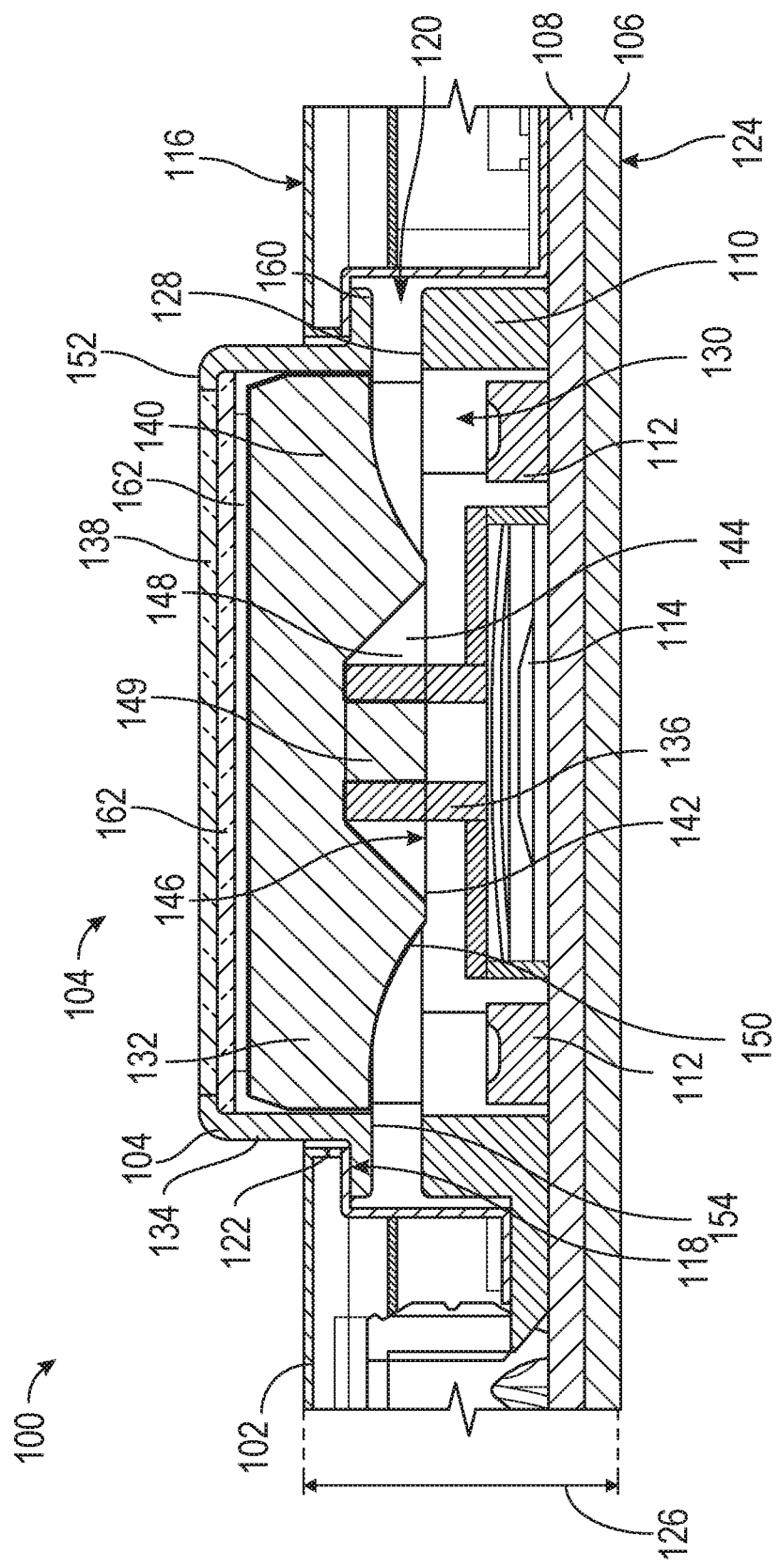
FIG. 7 is a sectional view of a portion of the switch panel of FIG. 1.

Referring to FIGS. 1-7, in some embodiments, a switch panel assembly 100 includes a cover 102 and at least one button assembly 104. In the embodiment of FIGS. 1-7, the switch panel assembly 100 includes six button assemblies 104, however the number of button assemblies 104 should not be considered limiting on the disclosure. As illustrated in FIG. 7, the switch panel assembly 100 may also include a back plate 106, a printed wire board (PWB) 108, at least one button stop 110, at least one light source 112, and/or at least one switch 114. The number, shape, size, and/or arrangement of the cover openings 122, the button assemblies 104, the button stops 110, the light sources 112, and/or the switches 114 of the switch panel assembly 100 should not be considered limiting on the disclosure.

Figure 1:
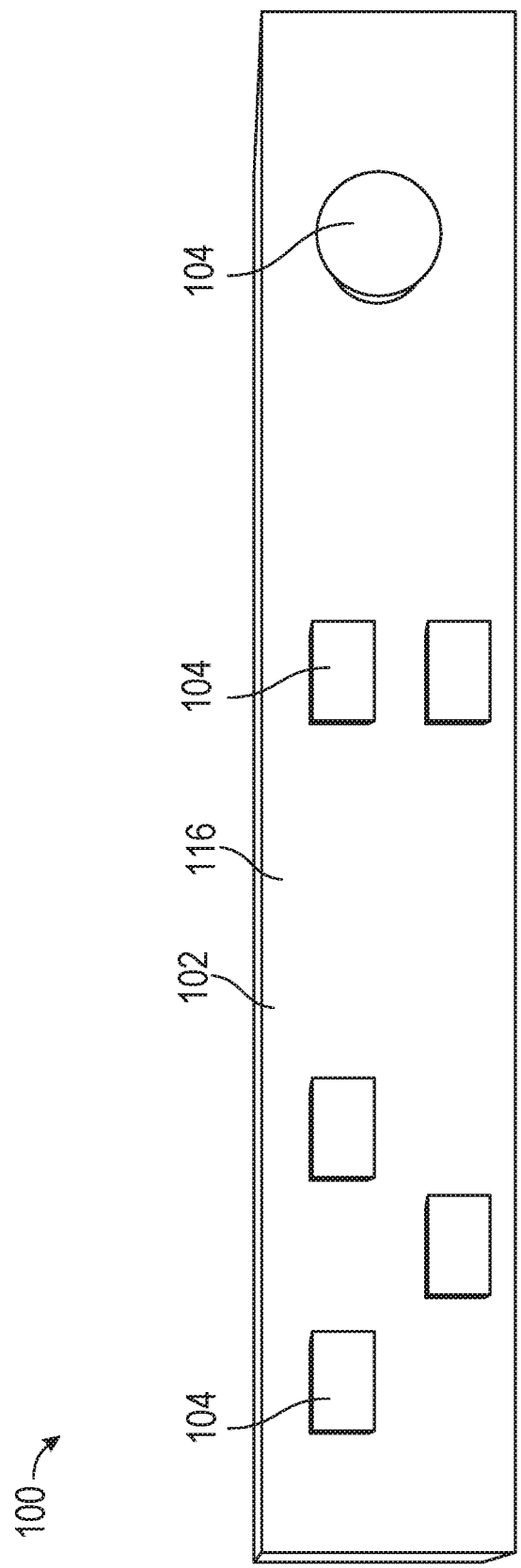
FIG. 1 is a perspective view of a switch panel assembly with a cover and a button assembly according to certain embodiments of the present invention.
Figure 2:
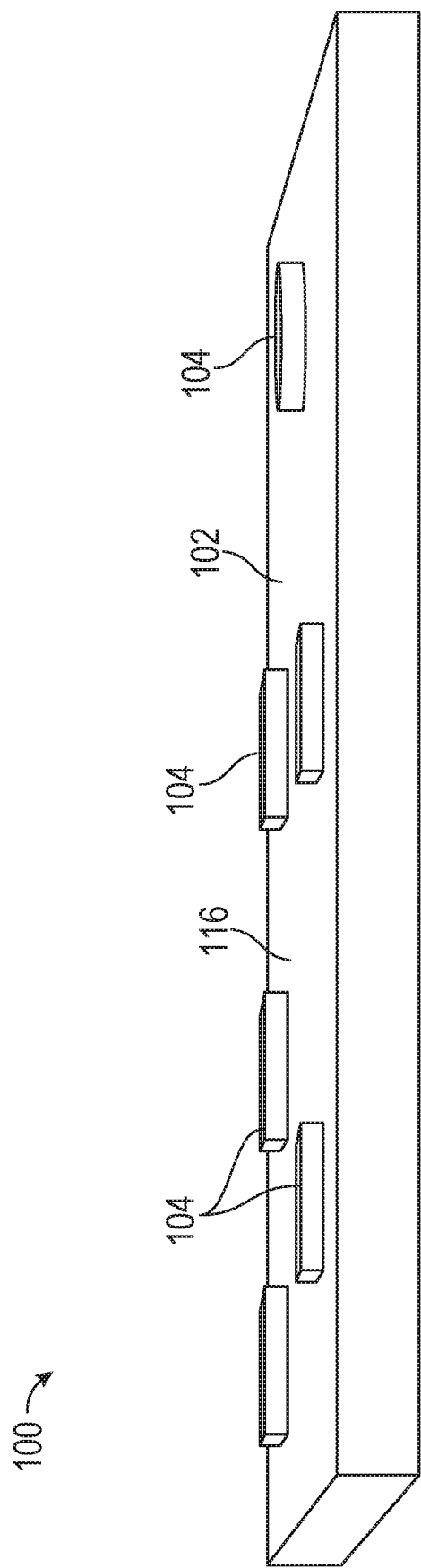
FIG. 2 is another perspective view of the switch panel assembly of FIG. 1.

As best illustrated in FIGS. 1, 2, and 7, the cover 102 includes an outer surface 116 and an inner surface 118, and the inner surface 118 defines a cover-receiving area 120. As discussed in detail below, various components of the switch panel assembly 100, such as portions of the button assemblies 104, may be housed within the cover-receiving area 120. The cover 102 includes at least one cover opening 122 that provides access to the cover-receiving area 120 and that receives a corresponding button assembly 104. As illustrated in FIG. 7, the light sources 112, the button stop 110, and the switch 114 for each button assembly 104 may be retained within the cover-receiving area 120. The associated button assembly 104 may be at least partially within the cover-receiving area 120 and the corresponding cover opening 122 and may be movable relative to the button stop 110 and the cover 102. The cover 102 may be formed of materials including but not limited to acrylic, aluminum, stainless steel, aramid fibers, polycarbonate, polypropylene, other metallic materials, other plastic materials, composite materials, or other materials that are able to provide the necessary structural integrity for the switch panel assembly 100.

Referring to FIG. 7, the back plate 106 includes an outer surface 124 that may be a mounting surface of the switch panel assembly 100 configured to interface with a vehicle (e.g., aircraft) mounting interface. The back plate 106 may be constructed from various suitable dielectric materials as desired, including but not limited to glass epoxy. In other examples, the back plate 106 may be constructed from various other materials as desired. In some non-limiting examples, a thickness of the back plate 106 is from about 0.635 mm to about 1.143 mm, such as about 0.7874 mm, although it need not be in other examples. As best illustrated in FIG. 7, the back plate 106 and the cover 102 may together define the cover-receiving area 120 for various components of the switch panel assembly 100.

A distance from the outer surface 116 of the cover 102 to the outer surface 124 of the back plate 106 is a thickness 126 of the switch panel assembly 100. In certain embodiments, the switch panel assembly 100 with the thickness 126 is a low profile switch panel assembly 100. As used herein, a "low profile" switch panel assembly has a thickness of less than about 9.525 mm. In some examples, the thickness 126 is from about 6.35 mm to about 9.525 mm. In various examples, the thickness 126 is of from about 5.08 mm to about 7.62 mm. In certain examples, the thickness 126 is less than or equal to about 6.35 mm.

The PWB 108 of the switch panel assembly 100 may mechanically support and electrically connect the various electrical components of the switch panel assembly 100. As best illustrated in FIG. 7, the PWB 108 may be provided within the cover-receiving area 120. The PWB 108 may be a single layer PWB or a multi-layer PWB as desired. In some non-limiting examples, a thickness of the PWB 108 is from about 0.635 mm to about 1.143 mm, such as about 0.7874 mm, although it need not be in other examples. In certain examples, when the back plate 106 interfaces with the mounting interface of the vehicle, the back plate 106 provides an intermediate dielectric layer between the PWB 108 and the mounting interface of the vehicle.

As best illustrated in FIG. 7, the button stop 110 for a particular cover opening 122 is provided within the cover-receiving area 120. In certain aspects, the button stop 110 is supported on the PWB 108 and has a thickness such that an engagement end 128 of the button stop 110 is spaced apart from the PWB 108. In various embodiments, a distance between the engagement end 128 of the button stop 110 and the portion of the inner surface 118 of the cover 102 adjacent to the cover opening 122 is a distance that the button assembly 104 may move, and the engagement end 128 may selectively engage the button assembly 104. In certain embodiments, the button stop 110 is configured to selectively engage a bottom side of the button assembly 104 to reduce or prevent over-travel of the button assembly 104 and/or damage to the switch 114.

As illustrated in FIG. 7, the button stop 110 defines a button stop receiving area 130. In certain cases, the button stop 110 defines a closed perimeter such that the button stop receiving area 130 is completely encircled, although in other embodiments the button stop 110 need not define a closed perimeter. The button stop 110 may be constructed from various suitable materials as desired, including but not limited to acetal, acrylic, aluminum, stainless steel, aramid fibers, polycarbonate, polypropylene, other metallic materials, other plastic materials, composite materials, or other similar materials as desired. In certain embodiments, the button stop 110 may be opaque to minimize or prevent the transmission of light from the light source(s) 112 in a direction other than towards the cover opening 122. In certain examples, the button stop 110 may have optical distribution properties such that the button stop can assist with light reflection of light emitted from the light source(s) 112.

As best illustrated in FIG. 7, each cover opening 122 and/or button assembly 104 includes at least one associated light source 112, and in certain embodiments, each cover opening 122 and/or button assembly 104 includes at least two associated light sources 112. As such, the number of light sources 112 associated with each cover opening 122 and/or button assembly 104 should not be considered limiting on the disclosure. In some cases, the light sources 112 may be light emitting diodes (LEDs), although in other embodiments, light sources other than LEDs may be utilized as desired. As illustrated in FIG. 7, the light sources 112 are provided on the PWB 108 within the button stop receiving area 130 (i.e., the button stop 110 surrounds the light sources 112) and are configured to direct light to the button assembly 104 of the particular cover opening 122. In embodiments with a plurality of button assemblies 104, each button assembly 104 may have one or more dedicated light sources 112.

The switch 114 is supported on the PWB 108 within the button stop receiving area 130 (i.e., the button stop 110 surrounds the switch 114) and may be various suitable switch assemblies or other suitable devices that may be engageable with the button assembly 104 such that the switch 114 is selectively activated or deactivated. In some non-limiting examples, the switch may be an external device (ED) switch that provides tactile feedback to a user. In various embodiments, the switch 114 is electrically connected with at least the light sources 112 on the switch panel assembly 100. In various embodiments, the switch 114 is electrically connected with the light sources 112 such that the light sources 112 may indicate a status of the switch 114. As some non-limiting examples, the light sources 112 may be activated if the switch 114 is activated and may be deactivated if the switch 114 is deactivated, or the light sources 112 may emit a first color or light pattern if the switch 114 is activated and may emit a second color or light pattern if the switch 114 is deactivated.

Referring to FIGS. 3-7, each button assembly 104 includes a button base 132, a button retainer 134, a plunger 136, and a lens 138. The button assembly 104 may have various suitable shapes or configurations as desired. In some cases, a length of the button assembly 104 is less than or equal to about 25.4 mm, such as about 12.7 mm, although in other examples, the length may be greater than 25.4 mm or less than 12.7 mm.

Figure 4:
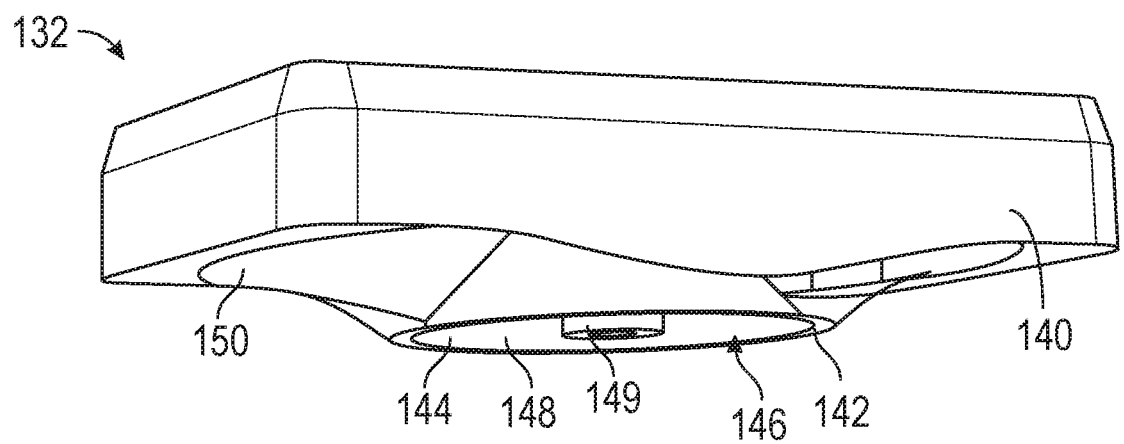
FIG. 4 is a perspective view of the button base of FIG. 3.
Figure 5:
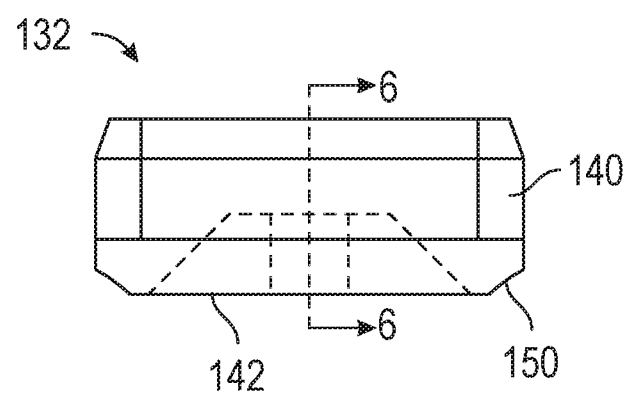
FIG. 5 is an end view of the button base of FIG. 4.

The button base 132 include a base side 140 and a bottom end 142. In certain aspects, the base side 140 may define a closed perimeter. Optionally, the base side 140 is opaque such that light distribution through the base side 140 is minimized or prevented. As best illustrated in FIGS. 4, 6, and 7, the button base 132 defines a plunger cavity 144 that is recessed relative to the bottom end 142, and the bottom end 142 of the button base 132 defines an opening 146 to the plunger cavity 144. A plunger stem 149 may be provided within the plunger cavity 144 that may connect with and support the plunger 136 such that the plunger 136 is at least partially within the plunger cavity 144. In other embodiments, the plunger stem 149 may be omitted and the plunger 136 may be integrally formed with the button base 132 and need not be a separate component. The plunger 136 is configured to selectively engage the switch 114. In various examples, the plunger 136 at least partially positioned within the plunger cavity 144 allows the plunger 136 to have a sufficient length such that the button assembly 104 can achieve desired switch tactile characteristics and otherwise engage the switch 114 as desired. In various examples, a wall 148 of the plunger cavity 144 may be chamfered and extend at various angles relative to the bottom end 142. In some cases, the wall 148 of the plunger cavity 144 is angled or chamfered at an angle of about 45°, although various other suitable angles may be utilized. In certain aspects, the angled wall 148 of the plunger cavity 144 may allow the plunger 136 to have normal dynamics during button depression and switch actuation. In some examples, the angled wall 148 may include optical distribution features such that the angled wall 148 assists in distribution of light from the light sources 112.

As best illustrated in FIGS. 3, 4, 6, and 7, the button base 132 includes a transition portion 150 between the bottom end 142 and the base side 140. In certain examples, the transition portion 150 has a bevel, a concave radius, and/or a concave arcuate shape. The transition portion 150 may have a non-linear cross-sectional profile as illustrated in FIGS. 3, 4, 6, and 7, although in other embodiments, the transition portion may have a linear cross-sectional profile. In various embodiments, the transition portion 150 may be clear or transparent such that the transition portion 150 may serve as a prism or a lens to further assist in light distribution from the light sources 112 through the button assembly 104. In certain aspects, and as best illustrated in FIG. 7, the transition portion 150 may be proximate to the light sources 112 when the switch panel assembly 100 is assembled. The transition portion 150 may extend completely around the plunger cavity 144 or may extend around only a portion of the plunger cavity 144 as desired.

Figure 3:
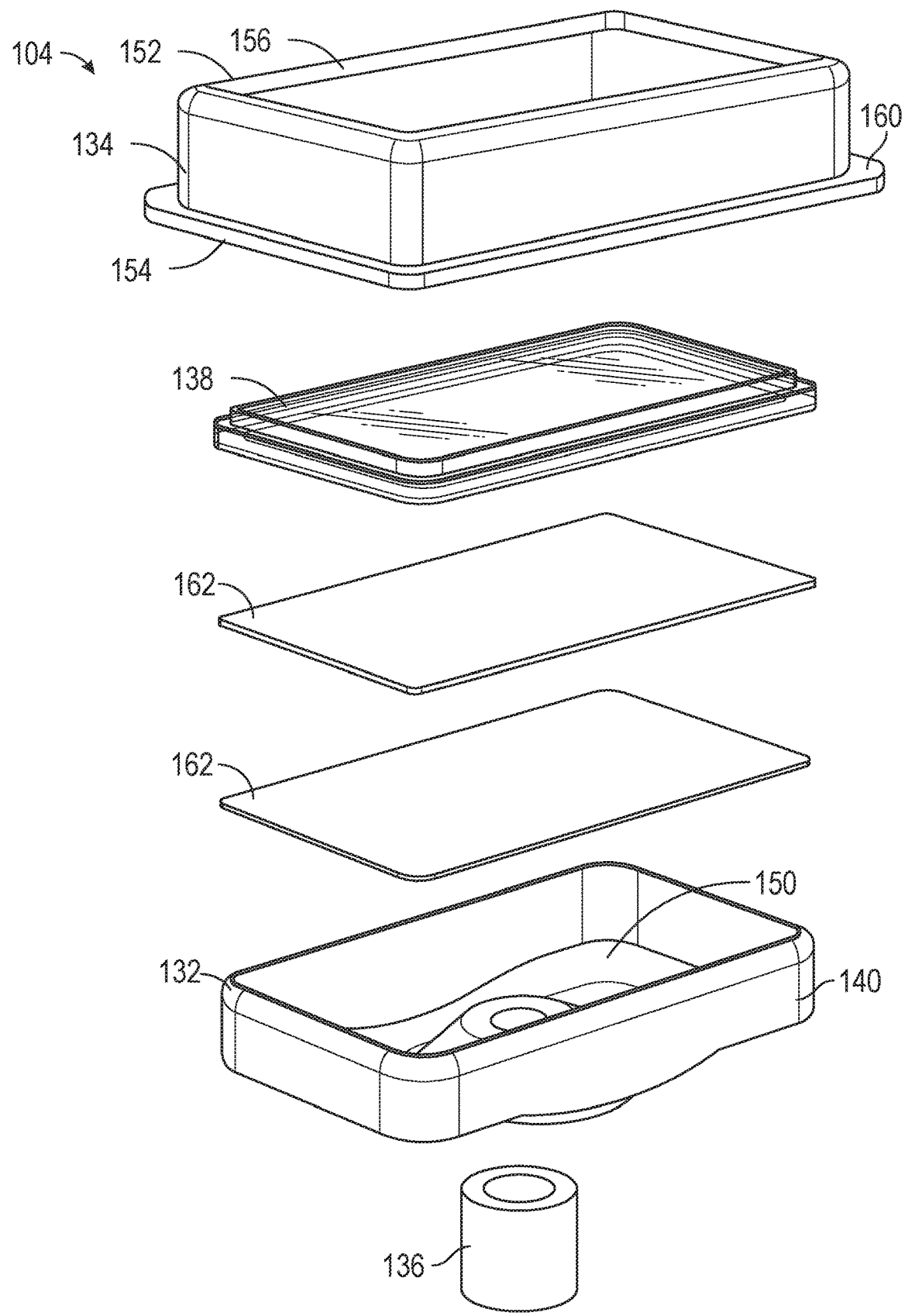
FIG. 3 is an exploded view of one of the button assemblies of FIG. 1 that includes a button base, a button retainer, and a lens according to certain embodiments of the present invention.

As best illustrated in FIGS. 3 and 7, the button retainer 134 includes a first end 152 and a second end 154, and a distance from the first end 152 to the second end 154 is a thickness of the button retainer 134. In certain aspects, the first end 152 includes a first end opening 156, and the button retainer 134 may receive the lens 138 in or adjacent to the first end opening 156. When the button assembly 104 is assembled with the cover 102, the first end 152 may be an outermost portion of the button assembly 104. The second end 154 of the button retainer 134 includes a second end opening 158, and the second end opening 158 may receive the button base 132 such that the button retainer 134 may positioned on the button base 132 with at least a portion of the button base 132 received within the button retainer 134. As best illustrated in FIGS. 3 and 7, the button retainer 134 includes a ledge 160 extending at least partially along a perimeter of the button retainer 134. In some cases, the ledge 160 is at the second end 154, although it need not be in other examples. In various embodiments, when the switch panel assembly 100 is assembled, the ledge 160 is within the cover-receiving area 120 between the inner surface 118 and the button stop 110. As discussed in detail below, the ledge 160 may selectively engage the inner surface 118 or the button stop 110 depending on a position of the button assembly 104 relative to the cover 102. In certain aspects, the button retainer 134 may be opaque to minimize or prevent the transmission of light from the light source(s) 112 in a direction other than through the first end opening 156 or the second end opening 158. In various aspects, the ledge 160 overlaps the edges of the cover opening 122 to minimize light from escaping through any gap in the switch panel assembly 100 between the cover opening 122 and the button assembly 104.

The lens 138 is supported on the button retainer 134 and may at least partially allow light distribution through the button assembly 104. The lens 138 may have various finishes as desired such that the lens provides a desired light distribution through the button assembly 104. As some non-limiting examples, the lens 138 may be polished, colored, prismatic, diffused (e.g., soda blasted), etc.

Optionally, the button assembly 104 may include various intermediate layers 162 (filters or other suitable types of layers) between the button base 132 and the lens 138 that selectively control the light distribution through the button assembly 104. As one non-limiting example, one or more intermediate layers 162 may block light distribution through portions of the lens 138 such that various text or other visual indicators are visible on the button when the light sources 112 are activated. In the embodiment of FIGS. 1-7, the button assembly 104 includes two intermediate layers 162. FIGS. 10A-B, 11A-B, and 12A-B illustrate some non-limiting examples of various text or visual indicators that might be visible due to the intermediate layers 162 and/or the lens 138. Various other suitable types of intermediate layers 162 or filters for controlling light distribution through the button assembly 104 may be utilized. In other embodiments, the intermediate layers 162 may be omitted, and the light distribution through may be controlled by the lens 138.

When the switch panel assembly 100 is assembled, the button retainer 134 extends partially through the corresponding cover opening 122. Light may be directed from the light sources 112, through the transition portion 150 of the button base 132, and through the button base 132, optionally through the one or more intermediate layer 162, and through the lens 138 out the first end opening 156. The button assembly 104 assembled with the switch panel assembly 100 may be movable between an engaged position and a disengaged position relative to the switch 114. FIG. 7 illustrates the button assembly 104 in the disengaged position. As illustrated in FIG. 7, the ledge 160 of the button assembly 104 engages the portion of the inner surface 118 of the cover 102 adjacent to the cover opening 122, and the ledge 160 is spaced apart from the button stop 110. In various embodiments, in the disengaged position, the plunger 136 is spaced apart from the switch 114. In various embodiments, in the engaged position, the plunger 136 of the button assembly 104 contacts the switch 114. In various embodiments, in the engaged position, the ledge 160 of the button retainer 134 engages the button stop 110. However, in certain aspects, the plunger 136 may contact the switch 114 without the ledge 160 engaging the button stop 110, and the ledge 160 may engage the button stop 110 at a maximum engaged position between the plunger 136 and the switch 114. Engagement between the ledge 160 and the button stop 110 may restrict further movement of the plunger 136 away from the cover opening 122 and may minimize potential damage to the switch 114 due to excessive movement.

The switch panel assembly 100 compartmentalizes each button assembly 104 with individual light source(s) 112, which may allow the button assemblies 104 to be individually controlled, installed, repaired, and replaced as needed and allow for the switch panel assembly 100 to be easily adapted as desired. The button stop 110 may surround the light sources 112 and switch 114 for a particular button assembly 104, which may assist in light reflection and prevent over-travel of the button assembly 104 and subsequent damage of the switch 114. The recessed plunger cavity 144 of the button base 132 may ensure that the plunger 136 has ample plunger length to achieve desired switch tactile characteristics and use dynamics during button depression and switch actuation. The components of the switch panel assembly 100 may also allow the switch panel assembly 100 to have the low profile and provide space savings in a vehicle having the switch panel assembly.

Figure 8:
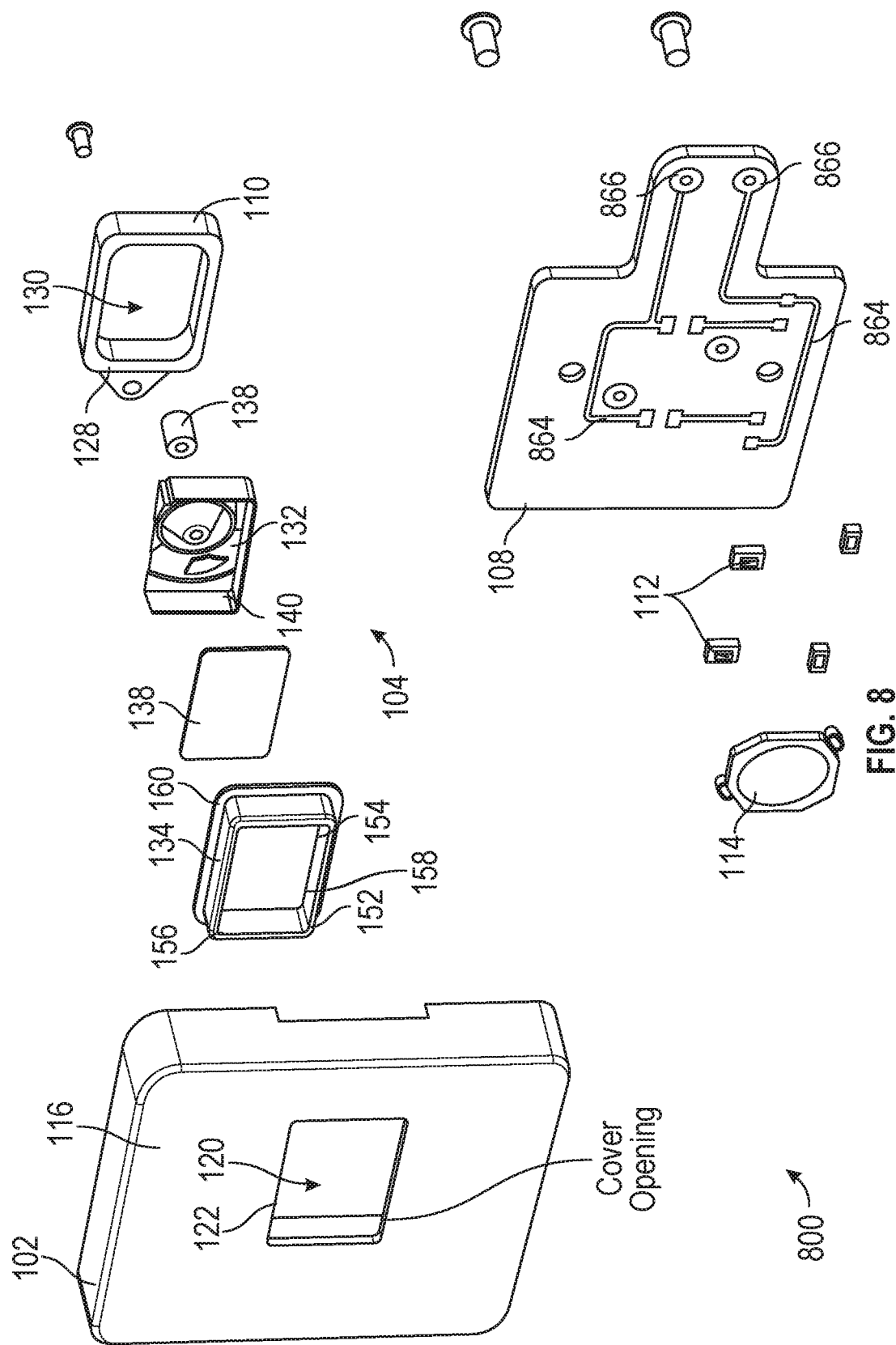
FIG. 8 is an exploded view of a switch panel with a button assembly according to certain embodiments of the present invention.
Figure 9:
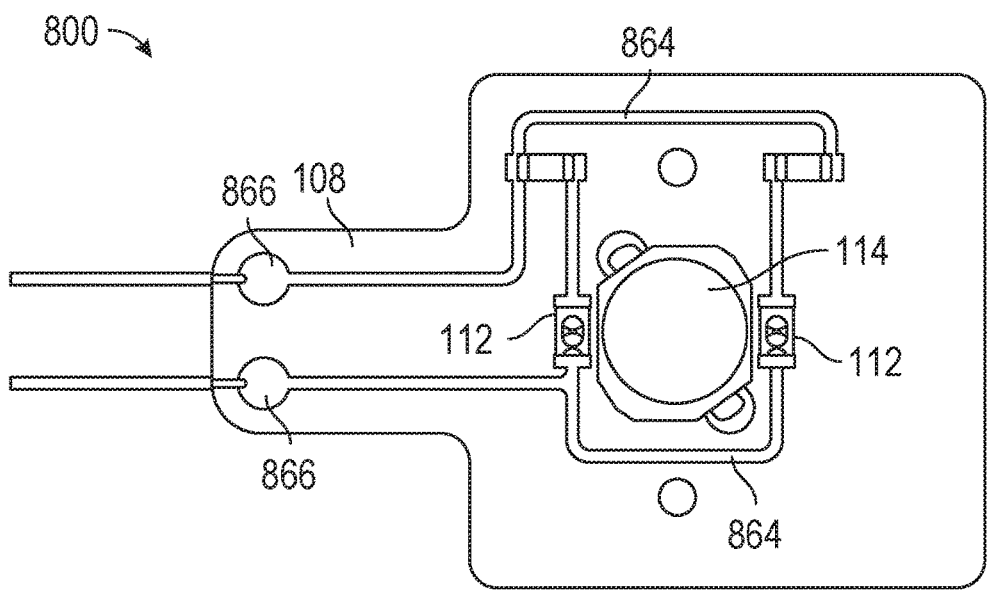
FIG. 9 is a top view of a printed wire board, a switch, and light sources of the switch panel assembly of FIG. 8.

FIGS. 8 and 9 illustrate another example of a switch panel assembly 800 according to various embodiments. The switch panel assembly 800 is substantially similar to the switch panel assembly 100 except that the switch panel assembly 800 has a different shape and includes a single button assembly 104. The switch panel assembly 800 also illustrates various wiring 864 on the PWB 108, including contacts 866 connectable to other components external to the switch panel assembly 800. Compared to the switch panel assembly 800, the button assembly 104 of the switch panel assembly 800 also omits the intermediate layers 162. Although not illustrated in FIGS. 8 and 9, the switch panel assembly 800 may have a back plate similar to the back plate 106 in various embodiments.

Figure 10A:
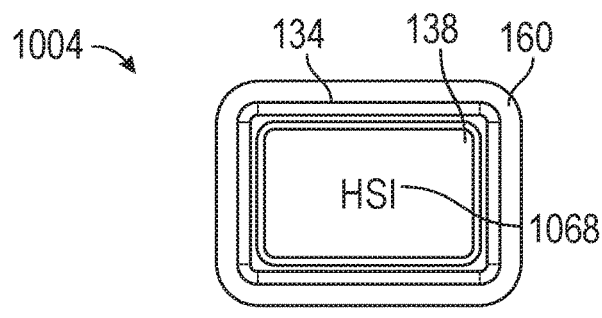
FIG. 10A is a top view of a button assembly for a switch panel according to certain embodiments of the present invention.
Figure 10B:
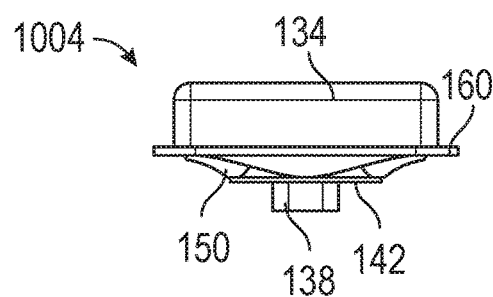
FIG. 10B is a side view of the button assembly of FIG. 10A.
Figure 11A:
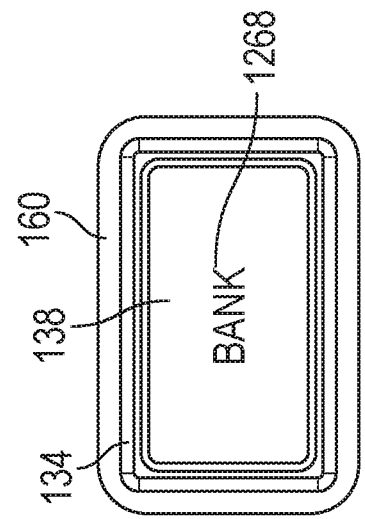
FIG. 11A is a top view of a button assembly for a switch panel according to certain embodiments of the present invention.
Figure 11B:
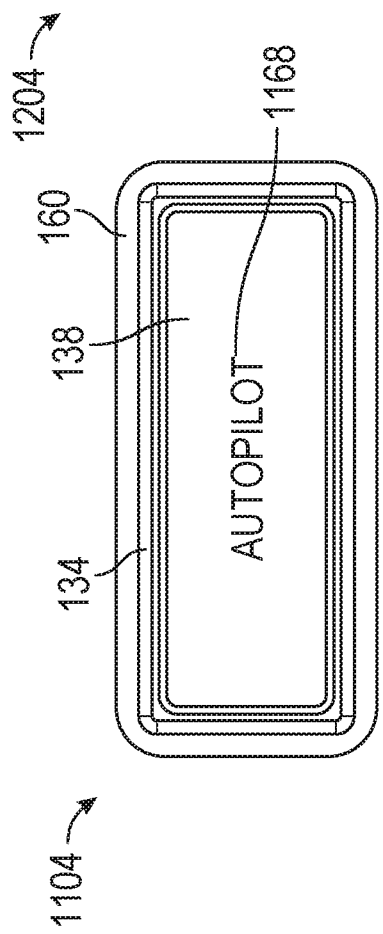
FIG. 11B is a side view of the button assembly of FIG. 11A.
Figure 12A:
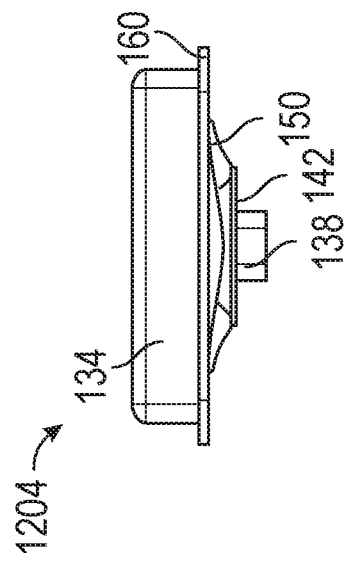
FIG. 12A is a top view of a button assembly for a switch panel according to certain embodiments of the present invention.
Figure 12B:
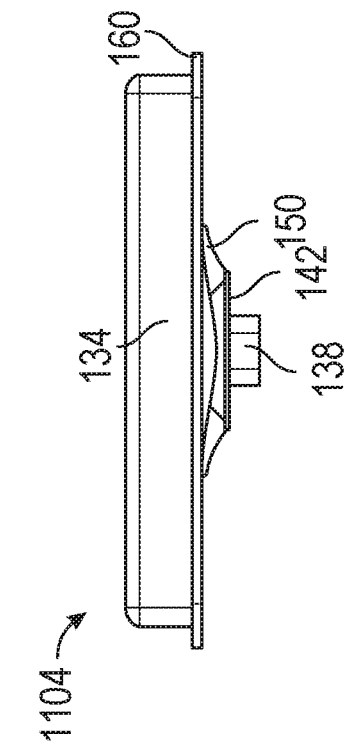
FIG. 12B is a side view of the button assembly of FIG. 12A.

FIGS. 10A-B illustrate an example of a button assembly 1004 that is substantially similar to the button assembly 104 and includes a non-limiting example of a visual indicator 1068 that includes text visible on the lens 138. FIGS. 11A-B illustrate an example of a button assembly 1104 that is substantially similar to the button assembly 1004 except that the button assembly 1104 is elongated and includes another non-limiting example of a visual indicator 1168 that includes text visible on the lens 138 and that is different from the visual indicator 1068. FIGS. 12A-B illustrate an example of a button assembly 1204 that is substantially similar to the button assembly 1004 except that the button assembly 1204 is elongated and includes another non-limiting example of a visual indicator 1268 that includes text visible on the lens 138 and that is different from the visual indicator 1068 and the visual indicator 1168.

A collection of exemplary embodiments, including at least some explicitly enumerated as "Examples," providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

Example 1. A switch panel for an aircraft comprising a cover and a back plate, wherein a distance from the cover to the back plate is a thickness of the switch panel, and wherein the thickness is less than about 9.525 mm.

Example 2. The switch panel of any preceding or subsequent examples or combination of examples, wherein the thickness is about 6.35 mm.

Example 3. A button assembly for a switch panel for an aircraft, the button assembly comprising: a button base comprising a bottom end, a base side, and a transition portion between the bottom end and the base side, wherein the transition portion of the button base is beveled or radiused with a sloped or concave shape; a button retainer supported on the button base; and a lens.

Example 4. The button assembly of any preceding or subsequent examples or combination of examples, wherein the transition portion is transparent such that light may pass through the button base to the lens.

Example 5. The button assembly of any preceding or subsequent examples or combination of examples, wherein the bottom end defines a plunger cavity recessed in the bottom end.

Example 6. The button assembly of any preceding or subsequent examples or combination of examples, wherein a cavity wall of the plunger cavity is reflective.

Example 7. The button assembly of any preceding or subsequent examples or combination of examples, further comprising a plunger stem within the plunger cavity.

Example 8. The button assembly of any preceding or subsequent examples or combination of examples, wherein a cavity wall of the plunger cavity is chamfered relative to the bottom end.

Example 9. The button assembly of any preceding or subsequent examples or combination of examples, wherein the button base is at least partially positioned within the button retainer.

Example 10. A switch panel comprising the button assembly of any preceding or subsequent examples or combination of examples.

Example 11. The switch panel of any preceding or subsequent examples or combination of examples, further comprising: a printed wiring board; a switch on the printed wiring board; LEDs on the wiring board; and a button stop on the wiring board and at least partially surrounding the switch and the LEDs, wherein the button stop is configured to selectively engage the button assembly.

Example 12. An aircraft switch panel assembly comprising: a cover defining a cover receiving area and a cover opening providing access to the cover receiving area; a button stop within the cover receiving area, wherein the button stop defines a button stop receiving area that is aligned with the cover opening; a switch within the button stop receiving area; at least one light source within the button stop receiving area; and a button assembly positioned at least partially in the cover opening and the cover receiving area, wherein the button assembly is movable between an engaged position and a disengaged position relative to the switch, and wherein, in the engaged position, the button assembly contacts the button stop and the switch.

Example 13. The aircraft switch panel assembly of any preceding or subsequent examples or combination of examples, wherein, in the disengaged position, a ledge of the button assembly contacts the cover and the button assembly is spaced apart from the button stop and the switch.

Example 14. The aircraft switch panel assembly of any preceding or subsequent examples or combination of examples, further comprising a back plate, wherein the cover receiving area is defined between the cover and the back plate, wherein the cover comprises a cover outer surface and the back plate comprises a back plate outer surface, and wherein a distance from the cover outer surface to the back plate outer surface is a thickness of the aircraft switch panel assembly, and wherein the thickness is less than 9.525 mm.

Example 15. The aircraft switch panel assembly of any preceding or subsequent examples or combination of examples, wherein the button assembly comprises: a button base comprising a bottom end, a base side, and a transition portion between the bottom end and the base side, wherein the transition portion of the button base is beveled or radiused with a concave or sloped shape; a button retainer supported on the button base; and a lens, wherein the button assembly is configured to direct light from below the button base from the at least one light source, through the transition portion, through the button retainer, and through the lens.

Example 16. The aircraft switch panel assembly of any preceding or subsequent examples or combination of examples, wherein the bottom end of the button base defines a plunger cavity recessed in the bottom end, wherein the button retainer comprises a ledge within the cover receiving area, and wherein the button assembly further comprises: a plunger at least partially within the plunger cavity, wherein the plunger contacts the switch in the engaged position, and wherein the ledge of the button retainer contacts the button stop in the engaged position.

Example 17. The aircraft switch panel assembly of any preceding or subsequent examples or combination of examples, wherein a cavity wall of the plunger cavity extends at an oblique angle relative to the bottom end.

Example 18. The aircraft switch panel assembly of any preceding or subsequent examples or combination of examples, wherein the button stop defines a closed perimeter, and wherein the button stop receiving area is within the closed perimeter.

Example 19. The aircraft switch panel assembly of any preceding or subsequent examples or combination of examples, wherein the button stop is opaque.

Example 20. A switch panel assembly for an aircraft, the switch panel assembly comprising: a cover defining a cover receiving area and a cover opening providing access to the cover receiving area, wherein the cover comprises a cover outer surface; a back plate defining a mounting surface of the switch panel assembly facing a direction opposite of the cover outer surface; a switch within the cover receiving area and aligned with the cover opening; and a button assembly positioned at least partially in the cover opening and the cover receiving area, wherein the button assembly is movable between an engaged position and a disengaged position relative to the switch, wherein a distance from the cover outer surface to the mounting surface of the back plate is a thickness of the switch panel assembly, and wherein the thickness is less than 9.525 mm.

Example 21. The switch panel assembly of any preceding or subsequent examples or combination of examples, further comprising: a button stop within the cover receiving area, wherein the button stop defines a button stop receiving area that is aligned with the cover opening; and at least one light source within the button stop receiving area, wherein the switch within the button stop receiving area.

Example 22. The switch panel assembly of any preceding or subsequent examples or combination of examples, wherein the button stop defines a closed perimeter, and wherein the button stop receiving area is within the closed perimeter.

Example 23. The switch panel assembly of any preceding or subsequent examples or combination of examples, wherein the thickness is 6.35 mm.

Example 24. The switch panel assembly of any preceding or subsequent examples or combination of examples, wherein, in the disengaged position, the button assembly contacts the cover within the cover receiving area and the button assembly is spaced apart from the switch, and wherein, in the engaged position, the button assembly contacts the switch and a ledge of the button assembly is spaced apart from the cover within the cover receiving area.

Example 25. The switch panel assembly of any preceding or subsequent examples or combination of examples, wherein the button assembly further comprises: a button base comprising a bottom end, a base side, and a transition portion between the bottom end and the base side, wherein the transition portion of the button base is beveled or radiused with a concave or sloped shape; a button retainer supported on the button base; and a lens, wherein the button assembly is configured to direct light from below the button base, through the transition portion, through the button retainer, and through the lens.

Example 26. The switch panel assembly of any preceding or subsequent examples or combination of examples, wherein the bottom end of the button base defines a plunger cavity recessed in the bottom end, wherein the button retainer comprises a ledge within the cover receiving area, and wherein the button assembly further comprises: a plunger at least partially within the plunger cavity, wherein the plunger contacts the switch in the engaged position.

Example 27. A button assembly for a switch panel for an aircraft, the button assembly comprising: a button base comprising a bottom end, a base side, and a transition portion between the bottom end and the base side, wherein the transition portion of the button base is beveled or radiused with a concave or sloped shape, and wherein the transition portion is transparent such that light may pass through the transition portion; a button retainer supported on the button base; and a lens, wherein the button assembly is configured to direct light from below the button base, through the transition portion, through the button retainer, and through the lens.

Example 28. The button assembly of any preceding or subsequent examples or combination of examples, wherein the bottom end of the button base defines a plunger cavity recessed in the bottom end, wherein the button retainer comprises a ledge, and wherein the button assembly further comprises: a plunger cavity recessed in the bottom end; and a plunger stem within the plunger cavity; and a plunger supported on the plunger stem at least partially within the plunger cavity.

Example 29. The button assembly of any preceding or subsequent examples or combination of examples, wherein a cavity wall of the plunger cavity extends at an oblique angle relative to the bottom end, and wherein the cavity wall is opaque.

Example 30. The button assembly of any preceding or subsequent examples or combination of examples, wherein the cavity wall is reflective, and wherein the oblique angle is 45°.

Example 31. The button assembly of any preceding or subsequent examples or combination of examples, further comprising at least one intermediate layer between the button base and the lens, and wherein the at least one intermediate layer comprises at least one of a diffuser or a filter.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed:

1. An aircraft switch panel assembly comprising:
   a cover defining a cover receiving area and a cover opening providing access to the cover receiving area;
   a button stop within the cover receiving area, wherein the button stop defines a button stop receiving area that is aligned with the cover opening;
   a switch within the button stop receiving area;
   at least one light source within the button stop receiving area; and
   a button assembly positioned at least partially in the cover opening and the cover receiving area, wherein the button assembly is movable between an engaged position and a disengaged position relative to the switch, and wherein, in the engaged position, the button assembly contacts the button stop and the switch,
   wherein, in the disengaged position, a ledge of the button assembly contacts the cover and the button assembly is spaced apart from the button stop and the switch.

2. The aircraft switch panel assembly of claim 1, further comprising a back plate, wherein the cover receiving area is defined between the cover and the back plate, wherein the cover comprises a cover outer surface and the back plate comprises a back plate outer surface, and wherein a distance from the cover outer surface to the back plate outer surface is a thickness of the aircraft switch panel assembly, and wherein the thickness is less than 9.525 mm.

3. The aircraft switch panel assembly of claim 1, wherein the button assembly comprises:
   a button base comprising a bottom end, a base side, and a transition portion between the bottom end and the base side, wherein the transition portion of the button base is beveled or radiused with a concave or sloped shape;
   a button retainer supported on the button base; and
   a lens, wherein the button assembly is configured to direct light from below the button base from the at least one light source, through the transition portion, through the button retainer, and through the lens.

4. The aircraft switch panel assembly of claim 3, wherein the bottom end of the button base defines a plunger cavity, wherein the button retainer comprises a ledge within the cover receiving area, and wherein the button assembly further comprises:
   a plunger at least partially within the plunger cavity, wherein the plunger contacts the switch in the engaged position, and wherein the ledge of the button retainer contacts the button stop in the engaged position.

5. The aircraft switch panel assembly of claim 4, wherein a cavity wall of the plunger cavity extends at an oblique angle relative to the bottom end.

6. The aircraft switch panel assembly of claim 1, wherein the button stop defines a closed perimeter, and wherein the button stop receiving area is within the closed perimeter.

7. The aircraft switch panel assembly of claim 1, wherein the button stop is opaque.

8. A switch panel assembly for an aircraft, the switch panel assembly comprising:
   a cover defining a cover receiving area and a cover opening, wherein the cover comprises a cover outer surface;
   a back plate defining a mounting surface of the switch panel assembly facing a direction opposite of the cover outer surface;
   a switch within the cover receiving area and aligned with the cover opening; and
   a button assembly positioned at least partially in the cover opening and the cover receiving area, wherein the button assembly is movable between an engaged position and a disengaged position relative to the switch,
   wherein a distance from the cover outer surface to the mounting surface of the back plate is a thickness of the switch panel assembly, and
   wherein the thickness is less than 9.525 mm,
   wherein the button assembly further comprises:
      a button base comprising a bottom end, a base side, and a transition portion between the bottom end and the base side, wherein the transition portion of the button base is beveled or radiused with a concave or sloped shape;
      a button retainer supported on the button base;
      and a lens, wherein the button assembly is configured to direct light from below the button base, through the transition portion, through the button retainer, and through the lens,
      wherein the bottom end of the button base defines a plunger cavity recessed in the bottom end, wherein the button retainer comprises a ledge within the cover receiving area, and wherein the button assembly further comprises:
      a plunger at least partially within the plunger cavity, wherein the plunger contacts the switch in the engaged position.

9. The switch panel assembly of claim 8, further comprising:
   a button stop within the cover receiving area, wherein the button stop defines a button stop receiving area that is aligned with the cover opening; and
   at least one light source within the button stop receiving area,
   wherein the switch is within the button stop receiving area.

10. The switch panel assembly of claim 9, wherein the button stop defines a closed perimeter, and wherein the button stop receiving area is within the closed perimeter.

11. The switch panel assembly of claim 8, wherein the thickness is 6.35 mm.

12. The switch panel assembly of claim 8, wherein, in the disengaged position, the button assembly contacts the cover within the cover receiving area and the button assembly is spaced apart from the switch, and wherein, in the engaged position, the button assembly contacts the switch and a ledge of the button assembly is spaced apart from the cover within the cover receiving area.

13. A button assembly for a switch panel assembly for an aircraft, the button assembly comprising:
   a button base comprising a bottom end, a base side, and a transition portion between the bottom end and the base side, wherein the transition portion of the button base is beveled or radiused with a concave or sloped shape, and wherein the transition portion is transparent such that light may pass through the transition portion;
   a button retainer supported on the button base;
   and a lens, wherein the button assembly is configured to direct light from below the button base, through the transition portion, through the button retainer, and through the lens, wherein the bottom end of the button base defines a plunger cavity recessed in the bottom end, wherein the button retainer comprises a ledge, and wherein the button assembly further comprises:
a plunger stem within the plunger cavity; and
a plunger supported on the plunger stem at least partially within the plunger cavity.

14. The button assembly of claim 13, wherein a cavity wall of the plunger cavity extends at an oblique angle relative to the bottom end, and wherein the cavity wall is opaque.

15. The button assembly of claim 14, wherein the cavity wall is reflective, and wherein the oblique angle is 45°.

16. The button assembly of claim 13, further comprising at least one intermediate layer between the button base and the lens, and wherein the at least one intermediate layer comprises at least one of a diffuser or a filter.

* * * * *